United States Patent [19]

Roth

[11] Patent Number: 5,074,105

[45] Date of Patent: Dec. 24, 1991

[54] LAKE RAKE AND METHODS

[76] Inventor: George L. Roth, 1501 Atlantis Dr., Apopka, Fla. 32703

[21] Appl. No.: 644,441

[22] Filed: Jan. 22, 1991

[51] Int. Cl.$^5$ ............................................. A01D 44/00
[52] U.S. Cl. ............................................. 56/8; 37/74; 56/400.15
[58] Field of Search ............... 56/8, 9, 400.15, 400.16, 56/400.2; 37/54, 55, 71, 74; 440/37; 114/270

[56] References Cited

U.S. PATENT DOCUMENTS

| | | |
|---|---|---|
| 2,050,133 | 8/1936 | Smith . |
| 2,648,940 | 8/1953 | Merkley et al. . |
| 2,737,769 | 3/1956 | Donald . |
| 2,961,817 | 11/1960 | Mitchell ................................... 56/8 |
| 3,751,887 | 8/1973 | den Herder et al. ..................... 56/8 |
| 4,070,978 | 1/1978 | Virgilio ................................. 114/26 |
| 4,137,693 | 2/1979 | Thompson et al. ....................... 56/8 |
| 4,328,658 | 5/1982 | Desrosiers et al. ....................... 56/8 |
| 4,616,588 | 10/1986 | Caddick ................................. 56/8 X |
| 4,696,149 | 9/1987 | Hawk .................................... 56/8 |
| 4,768,331 | 9/1988 | Jones .................................... 56/8 |

FOREIGN PATENT DOCUMENTS

| | | | |
|---|---|---|---|
| 930424 | 6/1955 | Fed. Rep. of Germany | ............ 56/8 |
| 15257 | of 1904 | United Kingdom | ..................... 56/8 |

*Primary Examiner*—David J. Bagnell
*Attorney, Agent, or Firm*—Edward M. Livingston

[57] ABSTRACT

An articulated-boom hoist is attachable to a motorized vehicle and structured to transfer an aquatic rake and rake float between a carrier and a body of water to be cleaned of aquatic plants. The aquatic rake is placed on the rake float. The rake float on the body of water is propelled to a select distance from the motorized vehicle. The aquatic rake is then removed from the rake float, dropped into the body of water and pulled towards the motorized vehicle with a winch and winch line attached to the motorized vehicle which is anchored appropriately in resistance to the winching action. Aquatic plants are uprooted from a bed of the body of water thereby. The articulated-boom hoist is then employed to lift the aquatic rake with aquatic plants gathered thereon from the body of water and position it above a transport vehicle or other dump site. The aquatic rake is tilted appropriately to cause aquatic plants to drop from it. Then the aquatic rake is repositioned back on the rake float to repeat the process as desired. The articulated-boom hoist can be either vertically swivelable or both vertically and horizontally swivelable, depending on use-condition tradeoff factors. If the articulated-boom hoist is horizontally swivelable, the motorized vehicle to which it is attachable need not be moved to dump aquatic plants from the aquatic rake. A float boom is optional for positioning the rake float with the aquatic rake thereon for drag-line cycles of operation.

33 Claims, 8 Drawing Sheets

LAKE RAKE AND METHODS

BACKGROUND OF THE INVENTION

This invention relates to removal of aquatic weeds from lakes and other bodies of water. In particular, it relates to equipment and methods for removal of roots of aquatic plants along with removal of the aquatic plants in order to minimize undesired aquatic regrowth.

As a result of particularly fast growth of plant life in lakes, there has long been a problem of removing aquatic plants to facilitate desired uses of lakes. Now with further increased rate of aquatic growth as a result of modern wastes that are highly fertilizing and, at the same time, increased use of lakes with increase in population, there is still greater need for efficient and effective removal of aquatic plants from lakes. Further yet, the type of aquatic plants that thrive on chemical wastes with fertilizing effects are more noxious to desired uses of lakes than normal aquatic growth.

A wide variety of machinery and methods have been devised for removing aquatic growth from lakes, ditches, canals and other bodies of water. For removing aquatic growth from lakes, most use some form of drag-line equipment. For ditches and canals, shorter removal distances have resulted in development of backhoe types of devices. None, however, have provided a device that can be attached conveniently to a tractor or other motorized vehicle, transported to and from a use site and utilized efficiently and effectively as taught by this invention. Furthermore, these prior methods and apparatuses destroy or modify the bottom of the lake or canal when they are used.

Examples of different prior art include the following U.S. patent documents:

U.S. Pat. No. 4,768,331 by Jones issued Sept., 1988; U.S. Pat. No. 4,696,149 by Hawk issued Sept., 1987; U.S. Pat. No. 4,616,588 by Caddick issued Oct., 1986; U.S. Pat. No. 4,328,658 by Desrosiers et al. issued May, 1982; U.S. Pat. No. 4,137,693 by Thompson et al. issued Feb., 1979; U.S. Pat. No. 4,070,978 by Virgilio issued Jan., 1978; U.S. Pat. No. 3,751,887 by den Herder et al. issued Aug., 1973; U.S. Pat. No. 2,737,769 by Donald issued Mar., 1956; U.S. Pat. No. 2,648,940 by Merkeley et al. issued Aug., 1953; U.S. Pat. No. 2,050,133 by Smith issued Aug., 1936.

The Jones patent was limited to a type of aquatic rake that would uproot aquatic plants. It did not provide machinery for operating the rake and the rake was very different in construction of its runner-like tines than the rake structure of this invention.

The Hawk patent provided for dragging bottoms of lakes to loosen aquatic plants and then scooping them up with a mesh scoop operated by a specially constructed marine vessel. It was not a land-operated mechanism with the construction and operational methods taught by this invention.

Caddick taught a marine vessel operable in navigable water for removing water pollutants. A basket or scoop was raised and lowered hydraulically similar to the manner that land scrapers are operated. It was not a land-operated drag-line mechanism like this invention.

Desrosiers et al. rotated cable to cause aquatic plants to be wrapped around the cable while the rotating cable was being dragged through water. It was not a loading and unloading mechanism in working relationship with a drag-line rake as provided by this invention.

Thompson et al. pushed and pulled a long handle on a rake with a pair of drive wheels to clean a beach adjacent to a lake.

Virgilio employed an articulated boom on a marine barge with stabalizing legs for weeding, dredging or cleaning waterways.

den Herder et al. employed a form of back-hoe on a king post assembly mounted to a set of wheels for clearing ditch and canal types of waterways.

Donald employed a form of back-hoe rake for cleaning drains and ditches.

Merkeley et al. rotated a circular cutter on the end of a boom for cleaning weeds from irrigation ditches.

Smith used a vehicle at both sides of canal-type waterways with a drag line operable between the two vehicles.

Neither of these devices nor any others known to the inventor provided a convenient and inexpensive dragline type of aquatic rake and the mechanism with which it could be transported and operated effectively when attached to most types of motorized vehicles normally used for agricultural, construction and industrial applications.

SUMMARY OF THE INVENTION

One object of this invention is to provide a lake-cleaning device that can be attached to most agricultural or industrial motorized vehicles.

Another object is to provide a lake-cleaning device that can be loaded and unloaded conveniently from a transport vehicle.

Another object is to provide an effective device and method for uprooting aquatic plants.

Another object is to provide an effective device for removing aquatic plants directly from lake beds in a single-pass operation.

Another object is to provide an effective device for removing aquatic plants from surface areas of bodies of water where they may have been left from being uprooted or where they may be growing.

Another object is to provide a device for loading harvested aquatic plants onto a transport vehicle or onto a dump site by maneuvering a vehicle to which a loading device is attached.

Still another object is to provide an inexpensive device and method for accomplishing all of the aquatic-plant removal and harvesting functions of this invention.

The present invention accomplishes the above objectives by providing an articulated-boom hoist attachable to a motorized vehicle and structured to transfer an aquatic rake and a boat or boat-like rake float between a carrier and a body of water to be cleaned of aquatic plants. The aquatic rake is placed on the rake float. The rake float on the body of water is propelled to a select distance from the motorized vehicle. The aquatic rake is then removed from the rake float, dropped into the body of water and pulled towards the motorized vehicle with a winch and winch line attached to the motorized vehicle which is anchored appropriately in resistance to the winching action. Aquatic plants are uprooted from a water bed of the body of water in a form drag-line action on an uprooting scoop. The articulated boom is then employed to lift the uprooting-scoop aquatic rake with aquatic plants gathered thereon from the body of water and position it above a transport vehicle or other dump site. The aquatic rake is tilted appropriately to cause the aquatic plants to drop from it. Then the aquatic rake is repositioned back on the rake float to repeat the process as desired. The articulated-boom hoist can be either vertically swivelable or both vertically and horizontally swivelable, depending on use-condition tradeoff factors. If the articulated-boom hoist is horizontally swivelable, the motorized vehicle to which it is attachable need not be moved to dump aquatic plants from the aquatic rake. A float boom is optional for positioning the rake float with the aquatic rake thereon for drag-line cycles of operation.

BRIEF DESCRIPTION OF THE DRAWINGS

The drawings used in conjunction with the forthcoming description to describe the preferred embodiments of this invention are as follows:

FIG. 1 3 is a rear view of a horizontally-swivelable articulated-boom hoist with an aquatic rake positioned over a truck as a dump site after having dropped aquatic plants from the aquatic rake into a truck bed;

DESCRIPTION OF PREFERRED EMBODIMENTS

Figure 1:
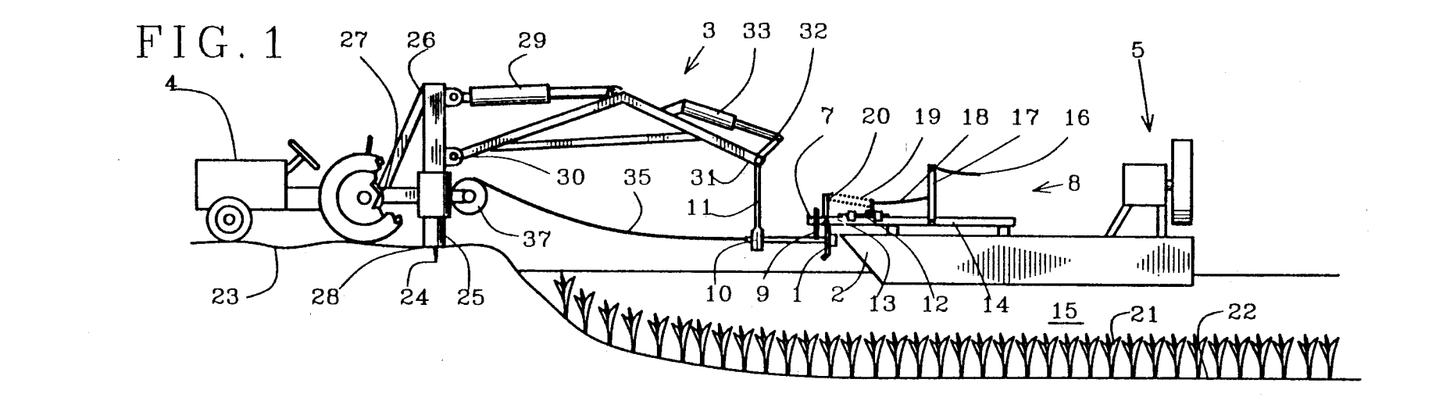
FIG. 1 is a cutaway side view of the invention showing an aquatic rake being placed onto a rake latch on a rake float in a body of water by an articulated-boom hoist having a separate vertically operational and anchor positional mechanism attached to a motorized vehicle.

Referring to FIG. 1, an aquatic rake 1 is positionable on a rake float 2 with an articulated-boom hoist 3 that is mountable on a motorized vehicle 4. The rake float 2 can be in the form of a boat with appropriate propulsion means 5 such as a propeller, paddle-wheel or water screw for the particular use-conditions. A variable-length float boom 6, illustrated in FIGS. 14 and 15, also may be employed for propelling or positioning the rake float 2 in relation to the motorized vehicle 4 and articulated-boom hoist 3.

Figure 5:
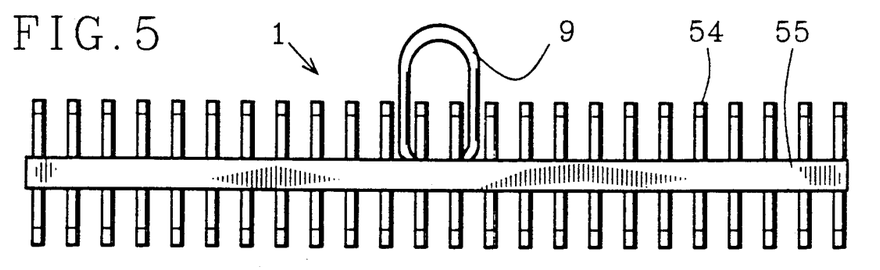
FIG. 5 is a rear view of an aquatic rake.
Figure 8:
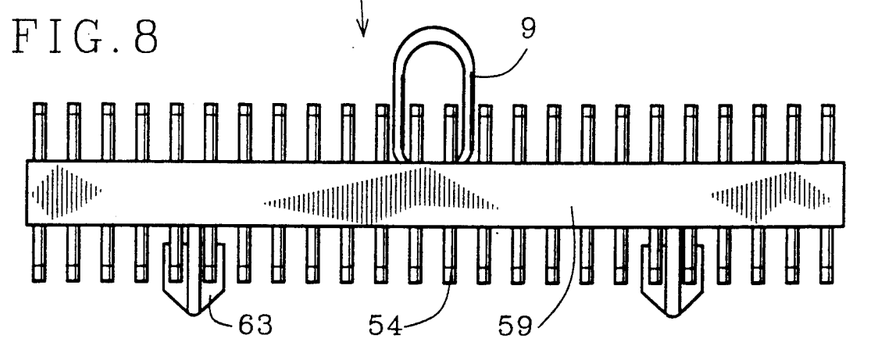
FIG. 8 is a rear view of water-surface skimming rake.

Holding the aquatic rake 1 on the rake float 2 can be accomplished in a way that the aquatic rake 1 can be removed and dropped conveniently from the rake float 2 with a rake latch 7 on a latch assembly 8. A rake-handle loop 9, shown in different views in FIGS. 5 and 8, is positioned on the rake latch 7 with a grasping mechanism 10 on an operative end of a manipulator arm 11 attachable swivelably to the articulated-boom hoist 3.

The rake latch 7 is held in horizontal position by a latch-lock member 12 being positionable slidably over latch extension 13. Latch-lock member 12 is slidably attached to latch beam 14. To release the rake latch 7 and allow the aquatic rake 1 to drop into a body of water 15, a latch release line 16 is pulled in the opposite direction from the rake latch 7 to actuate a latch release arm 17 which in turn pulls lock line 18 to remove latch-lock member 12 from a locking position on top of latch extension 13. Weight of aquatic rake 1 causes rake latch 7 to fall in opposition to latch spring 19 which is extended in contraction-biased relationship between latch-spring arm 20 and latch-lock member 12. After the aquatic rake 1 has been dropped off of rake latch 7, latch spring 19 returns rake latch 7 to a horizontal position where latch-lock member 12 is positioned again on top of latch extension 13 to hold rake latch 7 in position for a subsequent operational cycle of positioning aquatic rake 1 on rake latch 7.

Figure 2:
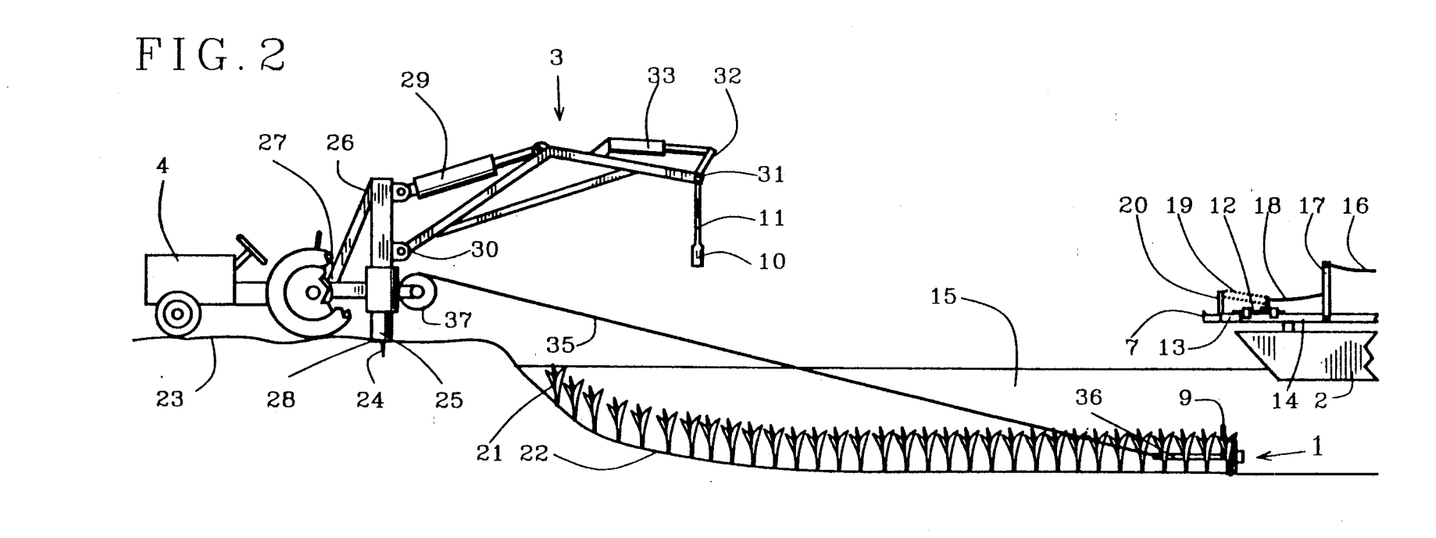
FIG. 2 is a cutaway side view of an aquatic rake being drug on a lake bottom towards a motorized vehicle with a winch attached to the motorized vehicle while the rake float with the rake latch thereon is in the body of water.

Referring to FIG. 2, aquatic rake 1 is pulled against aquatic plants 21 growing in lake bed 22 on a bottom surface of body of water 15. The rake float 2 with latch assembly 8 thereon floats in the body of water 15 while the aquatic rake 1 is being winched towards motorized vehicle 4.

Figures 16, 17, 18, 19:
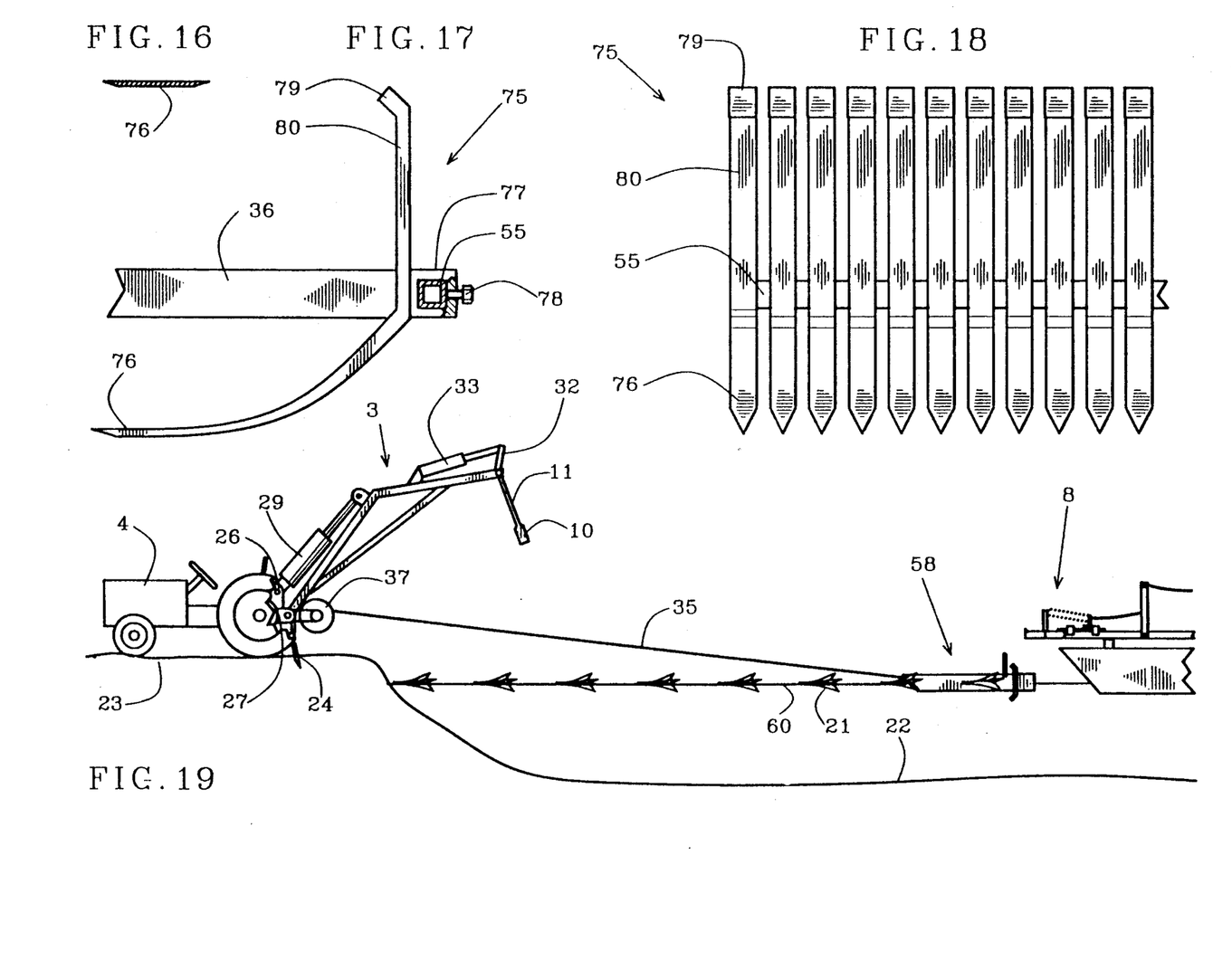
FIG. 16 is a cross-sectional view of a tip portion of an optional leaf-spring for the aquatic rake.
FIG. 17 is a side view of a leaf-spring tine attached to a horizontal rake bar.
FIG. 18 is a front view of a section of a horizontal rake bar with leaf-spring tines attached.
FIG. 19 is a cutaway side view of a skimming rake being drug inwardly from a rake float towards a motorized vehicle with a winch attached to an articulated-boom hoist attachable directly to a motorized vehicle without a separate center mount or anchor-lowering mechanism.

A motorized vehicle 4 can be anchored to land surface 23 with a anchor member 24. The anchor member 24 can be lowered and raised selectively with a separate anchor-operating mechanism 25. Here the anchoring mechanism is shown as a hydraulic or pneumatic device. The anchoring member 24 also can be attachable directly to articulated-boom hoist 3 as illustrated in FIG. 19.

Optionally, an anchoring mechanism can consist merely of weight a vehicle and a load it may carry. For instance, when the articulated-boom hoist may be attached to a relatively large truck as the motorized vehicle 4, a sufficient load may be contained by the truck to resist rake-winching action. If the motorized vehicle is a tracked vehicle, it has inherent anchoring characteristics within the meaning and foreseeability of this invention. Also, a motorized vehicle may be a towable or separately-positionable vehicle without independent mobility motorization but with motorization applicable to operation of the articulated-boom hoist 3 and optional variable-length float boom 6. Either type of motorized vehicle employed can be provided with a separate anchoring mechanism. This towable or separately positionable motorized vehicle is foreseeable within the scope of this invention particularly as an embodiment for possible use in conjunction with a truck rather than a tractor as a transport means.

An articulated-boom hoist 3 can be attachable to a particularly wide variety of forms of motorized vehicles 4 when top attachment point 26 is anchored appropriately above a bottom attachment point 27 and weight of the articulated-boom hoist 3 and loads it supports are supported by separate anchor fee 28 which are operable by means of anchor-operating mechanism 25. Anchor members 24 are optional for particular use-conditions.

Referring to FIGS. 1–4 and 11, articulated-boom hoist 3 is operable vertically by hoist lift arm 29 which can be a hydraulic or pneumatic device as illustrated. The hoist lift arm 29 is attachable pivotally to a rigid extension from the motorized vehicle. Top attachment point 26 is illustrated as the rigid extension to which hoist lift arm 29 is attached pivotally in FIGS. 1–4. The hoist lift arm 29 is extended between a rigid attachment point 26 and off-centered or eccentric hoist-attachment point on the articulated-boom hoist 3. The articulated-boom hoist 3 is attached to bottom attachment 27 at vertically swivelable mount 30.

A manipulator arm 11 with a grasping mechanism 10 at one end is attached pivotally to an articulated-boom hoist operative end 31. A manipulator lever arm 32 is extended from an opposing side of pivotal attachment of the manipulator arm 11. A lever-arm operator 33 is attachable pivotally to the articulated-boom hoist 3 and to the manipulator lever arm 32. The lever-arm operator 33 can be either a hydraulic or pneumatic device as illustrated, a motorized screw or other variable-length device. Selective expansion of the length of lever-arm operator 33 causes manipulator arm 11 with grasping mechanism 10 attached to swivel in one direction. Selective contraction causes the manipulator arm 11 to swivel in an opposite direction.

Figure 3:
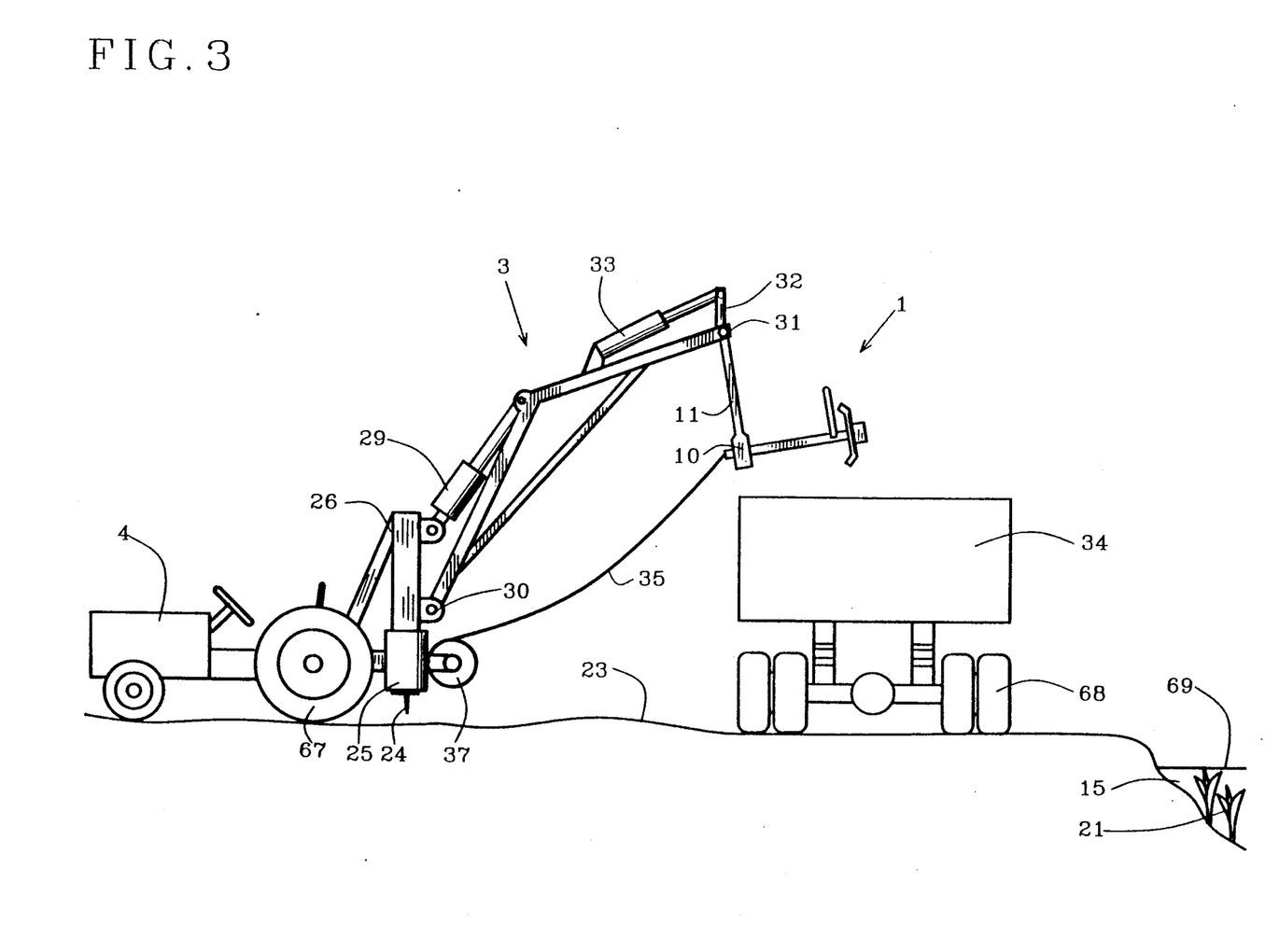
FIG. 3 is a side elevation view of an aquatic rake positioned over a truck after having had a load of aquatic plants dropped from it onto the truck.

Referring to FIG. 3, for use of an articulated-boom hoist 3 having only vertically-pivotal attachment to a motorized vehicle 4, the motorized vehicle 4 must be moved and maneuvered or positioned as desired with respect to location of a dump site such as a truck bed 34 as illustrated. This is similar to positioning of front-loader devices. To raise the manipulator arm 11 with an aquatic rake 1 in a grasping mechanism 10 above a dump site, such as a truck bed 34, hoist lift arm 29 is contracted. To tip aquatic rake 1 for causing aquatic plants thereon to drop from it, lever-arm operator 33 is contracted.

Referring to FIGS. 1, 2, 14, 15 and 19, a winch line or drag line 35 is attachable to a rake tongue 36 of an aquatic rake 1 and winched towards motorized vehicle 4 with winch 37 for harvesting or gathering aquatic plants 21 with a drag-line raking action. The drag line 35 can remain attached to aquatic rake 1 when the rake is being unloaded or placed on a rake float 2 as illustrated in FIGS. 2, 3, 13 and 14.

Figure 4:
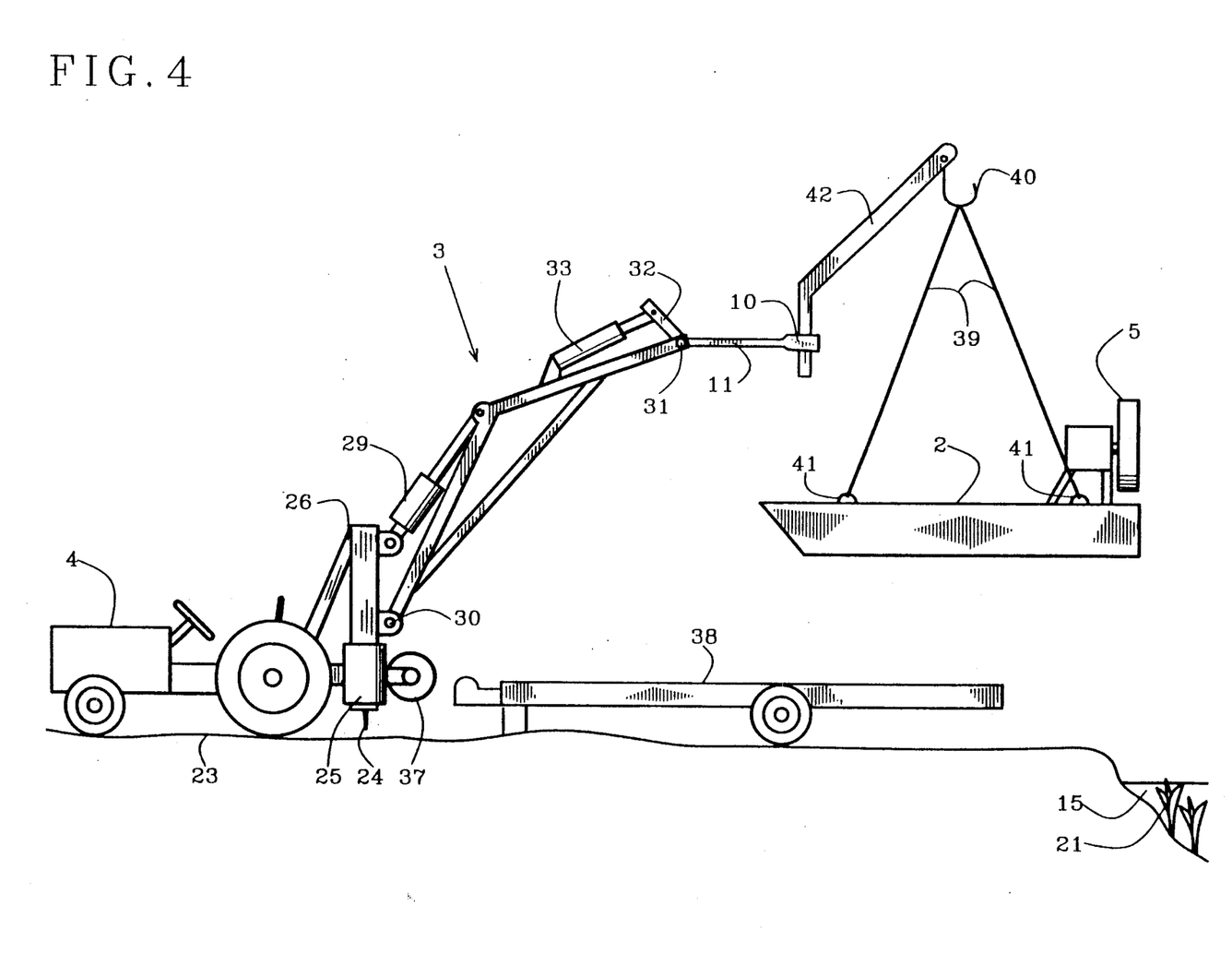
FIG. 4 is a side elevation view of a rake float in the form of a boat being removed from a boat carrier to be positioned on a body of water with an articulated-boom hoist attached to a motorized vehicle.

Referring to FIG. 4, a rake float 2 can be transferred between a carrier 38 and a body of water 15 by means of a sling 39 attached to a sling hook 40 attached to sling eyes 41 and maneuvered by articulated-boom hoist 3. The sling hook 40 can be carried with hook tool 42 grasped in grasping mechanism 10.

Figures 11, 12:
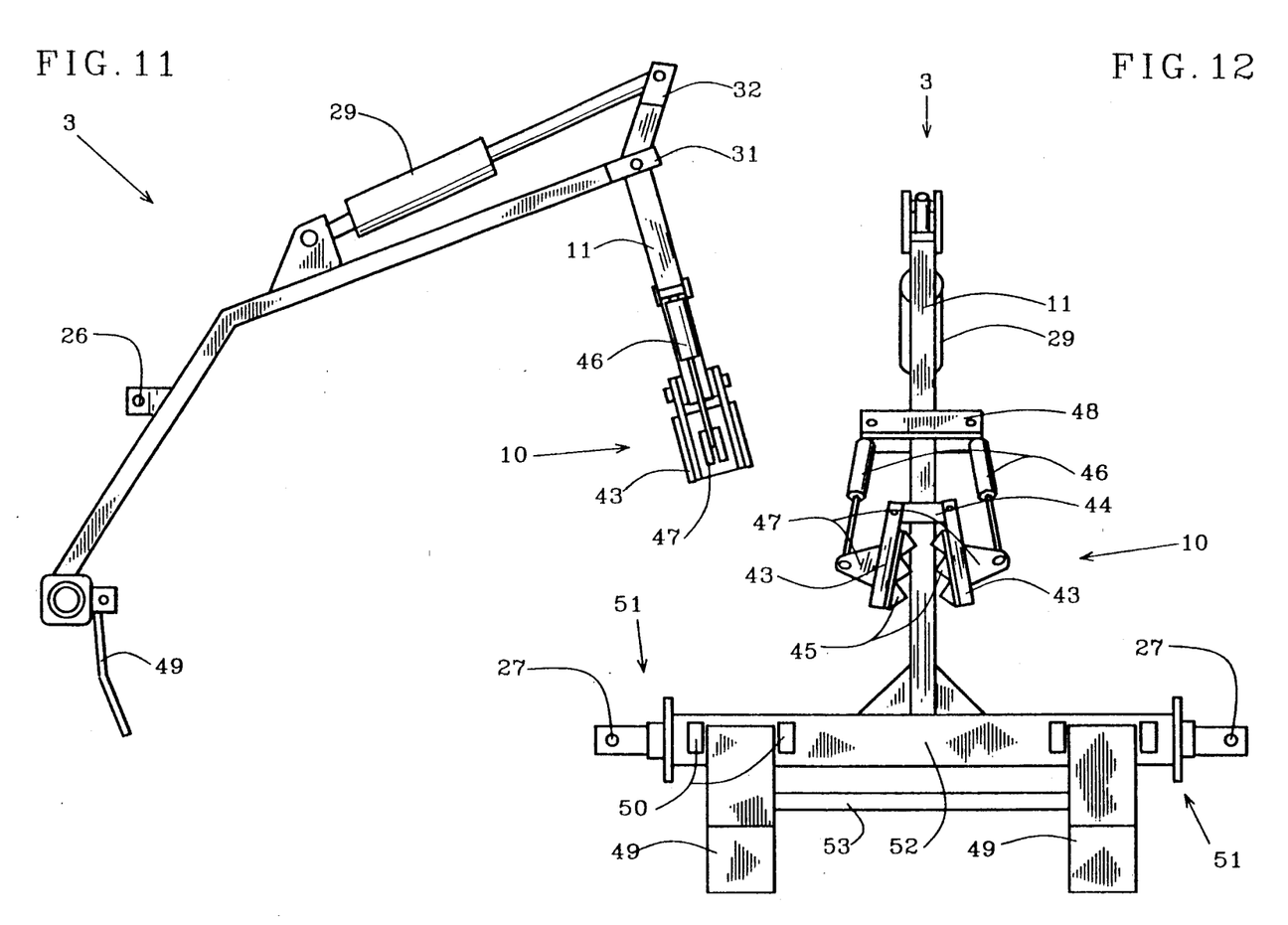
FIG. 11 is a side view of an articulated-boom hoist.
FIG. 12 is an end view of an articulated-boom hoist.

Referring to FIGS. 11 and 12, a grasping mechanism 10 can be a mechanical hand consisting of mechanical fingers 43 pivotally attached to opposite sides of manipulator arm 11 at a finger-attachment member 44. The mechanical fingers 43 can be plates with select grasping teeth 45 attached to the mechanical fingers 43 on surfaces facing each other. The mechanical fingers can be operated inwardly and outwardly to grasp and to release objects respectively with variable-length mechanical-finger actuators 46 which are attachable swivelably at one end to finger levers 47 and attachable at an opposite end to manipulator arm 11 at a finger-actuator attachment member 48.

The form of articulated-boom hoist 3 illustrated in FIGS. 11 and 12 is a relatively simple three-point attachment type that can be attached to tractors and industrial equipment with appropriate three-point-attachment components. Anchor plates 49 are slidable vertically between plate guides 50 positioned inwardly from opposite side attachment means 51 of attachment bar 52. The anchor plates 49 can be joined and operated vertically by selective operation of plate rod 53.

Figure 6:
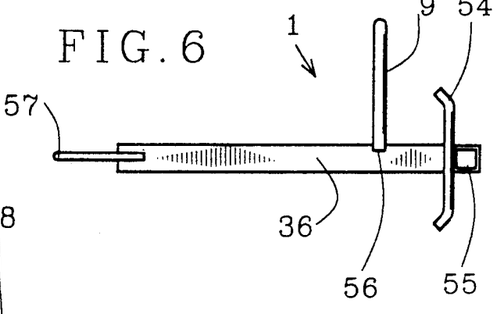
FIG. 6 is a side view of an aquatic rake.
Figure 7:
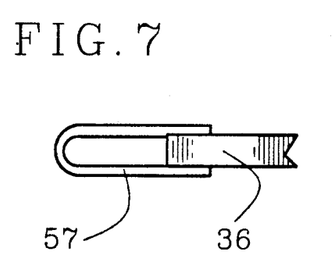
FIG. 7 is a top view of an aquatic-rake tongue-attachment section.

Referring to FIGS. 5–7, rake tines 54 are attached to a horizontal rake bar 55. The rake tines 54 can be cylindrical rods bent selectively forward at a select position vertically up and down from the horizontal rod 55. A rake tongue 36 is attached to the horizontal rod 55 at a select balance point 56. A winch-line attachment eye 57 is provided at a front end of the rake tongue 36. A rake-handle loop 9 can be attached to the rake tongue 36 at a position sufficiently close to the horizontal rod or bar 55 to prevent excessive backward tilting of the rake when it is loaded with aquatic plants. Typically, the horizontal bar would be heavy metal and may even be filled with cement to provide sufficient weight for gravity pressure on a lake bed 22 at the bottom of a body of water 15.

Figure 9:
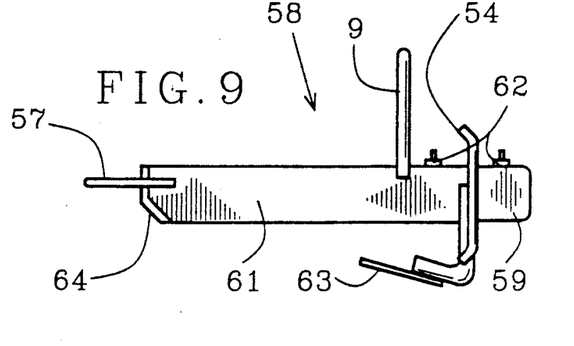
FIG. 9 is a side view of a skimming rake.
Figure 10:
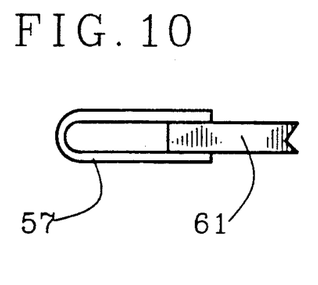
FIG. 10 is a top view of a skimming-rake tongue-attachment section.
Figure 14:
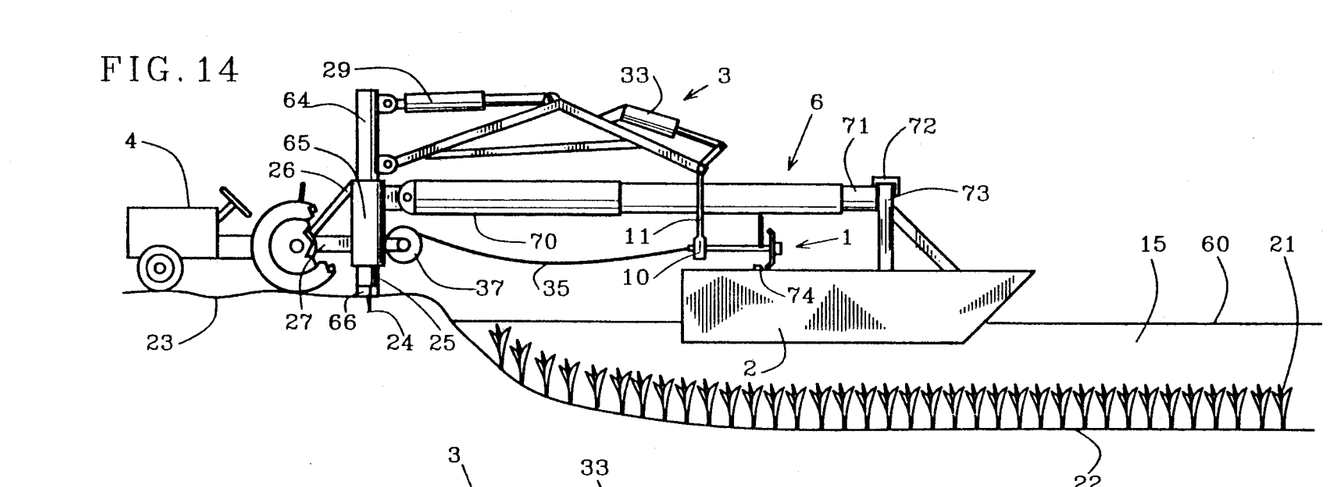
FIG. 14 is a side view of a horizontally-swivelable articulated-boom hoist positioning an aquatic rake on a rake float and having a variable-length float boom to position the rake float on a body of water for dropping the aquatic rake selectively in the body of water for drag-line operation.
Figure 15:
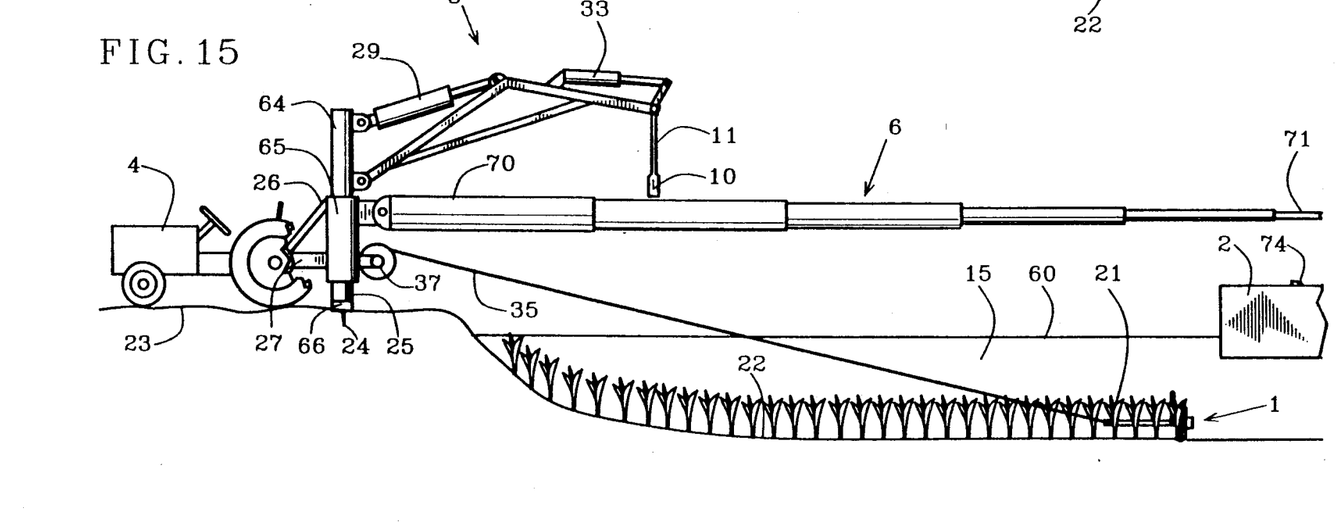
FIG. 15 is a side view of an aquatic rake being drug on a bottom of a body of water with a winch attached to a horizontally-swivelable articulated-boom hoist and a variable-length float boom extended between the hoist and the rake float during a drag phase of a rake-dragging operational cycle.

Referring to FIGS. 8–10, a water-surface or skimming rake 58 is provided with a relatively large and light skimming-rake bar 59 that is hollow or filled with flotation material such that it can float on the surface 60 of a body of water 15 as shown in FIGS. 14 and 15. A skimming-rake tongue 61 also is a flotation device. When hollow, rather than filled with flotation material, air can be inserted under pressure into the skimming-rake bar 59 and the skimming-rake tongue 61 through air inlet valves 62. Either the air under pressure or flotation material in the hollow bar 59 and hollow tongue 61 can provide structural integrity for relatively thin and light material from which they can be constructed. A runner 63 can be provided with upward tilt to carry the aquatic rake or the skimming rake over obstructions. The skimming rake 58 is provided additionally with a tapered front 81 to assist in passage over obstructions at water edges such as shore lines, ramps and other places. A rake-line attachment loop 57 can be provided for both aquatic rakes 1 and for skimming rakes 58.

Figure 13:
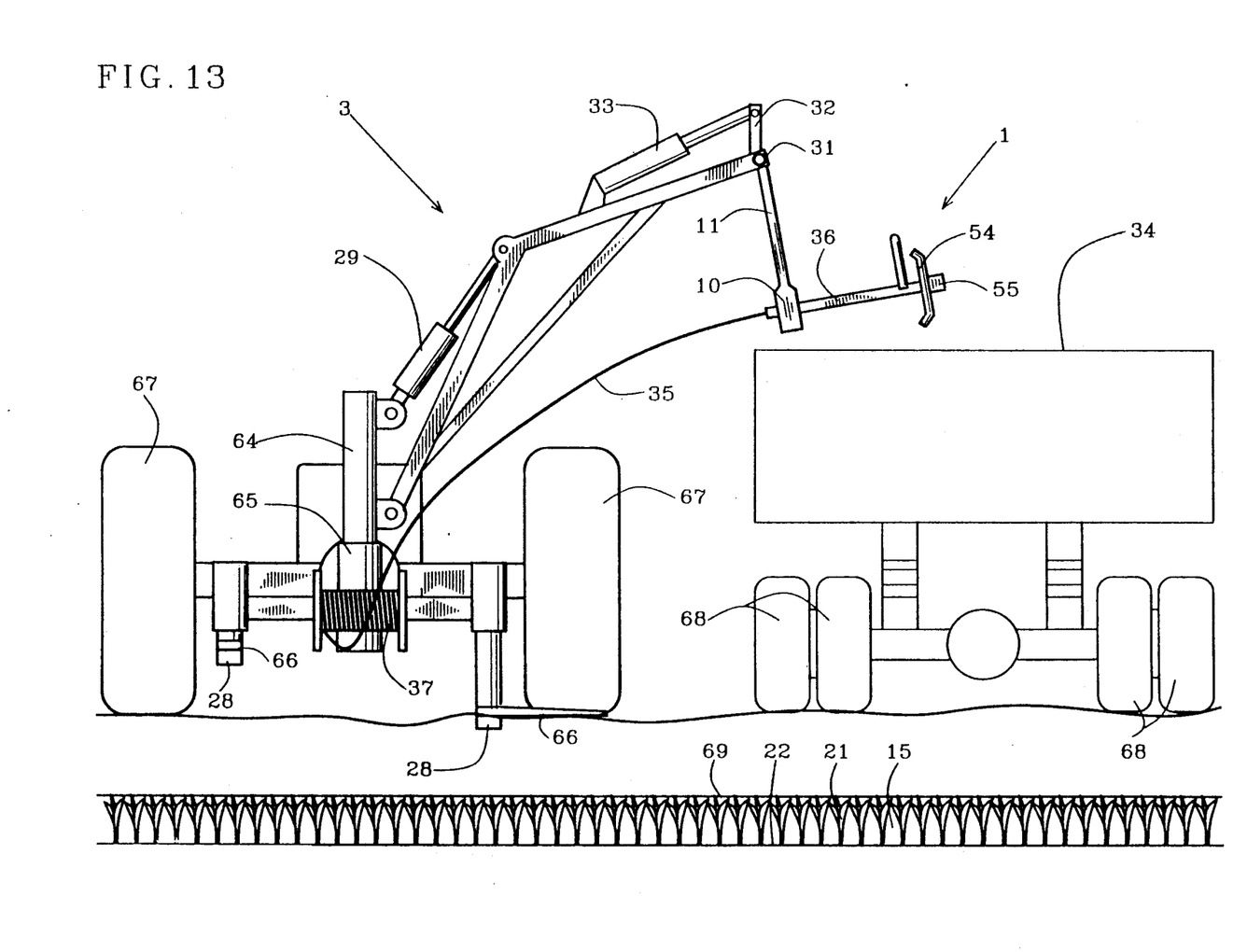

Referring to FIGS. 13–15, articulated-boom hoist 3 can be pivotal horizontally on a swivel rod 64 that is rotatable selectively in a horizontal-swivel base 65. When the hoist 3 is swivelable horizontally in addition to being swivelable vertically, dumping or unloading aquatic growth from the aquatic rake can be achieved without moving the motorized vehicle. Instead, a truck bed 34 or other dump site can be positioned at a side or at both sides of the motorized vehicle. This decreases labor costs and provides increased efficiencies similar to the efficiencies for a power shovel over a front-end loader in conventional loading operations. To prevent side tipping of the motorized vehicle, side plates 66 can be positionable at a base of anchor feet 28.

The side plates 66 can be pivotal horizontally in order to be narrow enough for road conditions when in transit and wide enough to support side weight of a loaded rake and the hoist 3 when positioned to a side of the motorized vehicle 4 as illustrated in FIG. 13. At the left side of the motorized vehicle 4 in FIG. 13, a side plate is illustrated in up position and pointed to the rear. At the right side of the motorized vehicle 4 in FIG. 13, a side plate 66 is illustrated in down position on land surface 23 and pointed to a side in the direction of truck bed 34 to prevent tipping in the direction of extended hoist 3 with rake 1 attached.

The motorized-vehicle wheels 67 and truck wheels 68 are on land surface 23 above water line 69 below which aquatic plants 21 are growing in the body of water 15. A winch 37 with a winch line or drag line 35 is shown in loose contact with rake 1 while the rake 1 is being unloaded. The drag line 37 also can be conveniently disconnected and connected between rake-unloading cycles as a result of a large and convenient attachment eye 57.

In FIG. 14, a variable-length float beam is attached pivotally to swivel base 65 at a telescoped base end 70. A small end 71 can be provided with a float-boom hook 72 that is positionable on a float-boom post 73. The rake float 2 can be propelled outwardly in the body of water 15 from the motorized vehicle 4 by pneumatically pressuring float beam 6. When the rake float 2 is at a desired position on the body of water 15, the rake float can be held steadily at such position in opposition to inward winching action while the aquatic rake 1 or the skimming rake 58 are pulled off an inward end of the rake float 2 and dumped into the body of water 15 with the winch 37.

To prevent the rake 1 from being pulled off of the rake float 2 prematurely with the drag line 35 or with rocking action of the rake float 2, tapered ridges 74 or other selective-resistance means can be provided on top of the float 2 at sides of the rake 1.

The rake float 2 can be a totally enclosed floating device when a float boom 6 is employed to position the float 2 on a body of water.

Although the float boom 6 is illustrated being employed in conjunction with a horizontally-swivelable hoist 3 in FIGS. 14 and 15, the float boom 6 can be used also with a hoist 3 that is swivelable only vertically and constructed either with or without separate base-positioning means 28.

When it is desired to return the rake float 2 towards the motorized vehicle 4, negative pressure can be applied within the float beam 6 or a separate line can be employed to pull the rake float 2 and float boom 6 appropriately.

In FIG. 15, aquatic rake 1 is being winched towards motorized vehicle 4.

Referring to FIGS. 16-18, a leaf-spring rake tine 75 can be attached to the horizontal rake bar 52. The leaf-spring tine 75 can have a relatively flat tip 76 and a graduated thickness as it is curved upwards to an optional rectangular attachment housing 77 with an optional set screw 78 for positioning the tines 74 on the rake bar 52. A tine scoop section 79 can be extended vertically and then selectively forward at a tine top section 80. The leaf-spring tines 75 can be positioned with appropriate distance between them for particular types of aquatic growth 21. The tips 76 can be optimally pointed and sharpened or selectively blunt. A leaf-spring rake can be optimized for pulling and cutting action, for removing aquatic plants 21 and for containing them in a scoop formed by a plurality of the leaf-spring tines 75.

Referring to FIG. 19, a skimming rake 58, like an aquatic rake 1, can be operated with an articulated-boom hoist 3 having either type of attachment to the motorized vehicle 4.

All modifications, alternations, adaptations, applications and variations thereof as foreseeable within the following appended claims as described by the foregoing description of preferred embodiment are included within this invention.

Having described the preferred embodiments of my invention, I claim:

1. A lake rake comprising:
   an articulated-boom hoist attachable to a motorized vehicle;
   a winch attachable to the motorized vehicle in workable proximity to the articulated-boom hoist;
   an aquatic rake attachable to a line from the winch;
   a rake float on which the aquatic rake is transportable on body of water;
   a grasping mechanism attachable to an opposite end of the articulated-boom hoist from an end of the articulated-boom hoist that is attachable to the motorized vehicle;
   a means for conveying the rake float between a carrier and the body of water;
   a means for positioning the aquatic rake on the rake float;
   a means for removing the aquatic rake from the rake float when the rake float is at a select distance from the motorized vehicle on the body of water;
   a means for positioning the rake float at select distances from the motorized vehicle on the body of water;
   a winch line operable by the winch in winching relationship between the motorized vehicle and the aquatic rake at select distances from the motorized vehicle in the body of water;
   a means for anchoring the motorized vehicle in opposition to winching action between the aquatic rake and the motorized vehicle; and
   a means for conveying aquatic growth from the aquatic rake to an aquatic-growth dump site.

2. A lake rake according to claim 1 wherein the motorized vehicle is a land vehicle.

3. A lake rake according to claim 2 wherein the land vehicle is a tractor.

4. A lake rake according to claim 2 wherein the articulated-boom hoist is swivelable vertically about a point of attachment to the land vehicle.

5. A lake rake according to claim 4 and further comprising:
   a hoist lift arm that is expandable and contractible selectively in length mechanically and is swivelably attachable to the land vehicle and to the articulated-boom hoist at a position vertically above swivelable attachment of the articulated-boom hoist to the land vehicle.

6. A lake rake according to claim 5 wherein mechanical contraction and expansion of the hoist lift arm is hydraulic.

7. A lake rake according to claim 5 and further comprising:

a manipulator arm attachable swivelably to an operative end of the articulated-boom hoist opposite to an end of the articulated-boom hoist that is attachable to the land vehicle;

a manipulator lever arm extended a select distance from swivelable attachment of the manipulator arm to the articulated-boom hoist;

a lever-arm operator having selectively-variable length and attachable pivotally at opposite ends to the manipulator lever arm and the articulated-boom hoist; and a grasping mechanism attachable to an end of the manipulator arm.

8. A lake rake according to claim 7 wherein the boom grasping mechanism is a mechanical hand.

9. A lake rake according to claim 8 and further comprising:

mechanical fingers swivelably attachable to the mechanical hand;

mechanical-finger actuators swivelably attachable at one end to the mechanical hand and swivelably attachable at an opposite end of the mechanical-finger actuators to the mechanical fingers; and a means for selective variation of length of the mechanical-finger actuators.

10. A lake rake according to claim 9 wherein the means for selective variation of length of the mechanical-finger actuators is hydraulic.

11. A lake rake according to claim 2 wherein the means for positioning the rake float at select distances from the motorized vehicle on a body of water is a boat-propulsion means attachable to the float.

12. A lake rake according to claim 1 wherein the rake float is a boat sized and shaped to transport the aquatic rake and provided with a propulsion means.

13. A lake rake according to claim 1 wherein the means for positioning the rake float at select distances from the motorized vehicle on a body of water is a float arm that is expandable and contractible in length and attachable to the motorized vehicle and the float.

14. A lake rake according to claim 1 wherein the articulated-boom hoist is attachable to the motorized vehicle at each side and at a central position in relation to the articulated-boom hoist.

15. A lake rake according to claim 1 wherein the articulated-boom hoist is pivotal horizontally.

16. A lake rake according to claim 15 wherein the motorized vehicle is provided with side plates positionable parallel to horizontal pivoting of the articulated-boom hoist.

17. A lake rake according to claim 1 wherein the aquatic rake is provided with tines which are extended vertically upward and downward from a point of attachment of each to a horizontal bar;

a rake tongue extended orthogonally from a central position on the horizontal bar;

ends of the tines which are extended at select angles in a direction of the rake tongue; and a rake support loop at a top side of the aquatic rake.

18. A lake rake according to claim 17 wherein the horizontal bar is provided with a float having sufficient buoyancy to support the aquatic rake at a surface of water as an aquatic surface rake in which the aquatic surface rake is positioned.

19. A lake rake according to claim 1 wherein the aquatic rake is provided with tines which are leaf-spring tines extended forwardly and selectively downward from a horizontal bar.

20. A lake rake according to claim 19 wherein the leaf-spring tines are provided with selectively pointed downward ends.

21. A lake rake according to claim 20 and further comprising:

a means for attaching the leaf-spring tines to the horizontal bar with select spacing between the leaf-spring tines.

22. A lake rake according to claim 21 wherein the leaf-spring tines are graduated in thickness selectively from downward ends to a point of attachment to the horizontal bar.

23. A lake rake according to claim 22 and further comprising:

a scoop extension of each leaf-spring extended at a select angle above the horizontal bar.

24. A lake rake according to claim 1 wherein the rake float is selectively boat-shaped and further comprising:

a float boom having variable length extendible in selective boat-propulsion relationship between the motorized vehicle and a vertically swivelable boom attachment at a front section of the rake float on a body of water;

a rake-holding means at a rear section of the rake float for selectively resisting movement of the lake rake with the winch line in opposition to propulsion of the rake float with the float boom in a direction away from the motorized vehicle; and a rake-release means for allowing the lake rake to be pulled from the boat and placed in the body of water selectively with the winch and winch line in opposition to resistance of the float boom.

25. A lake rake according to claim 1 wherein the articulated-boom hoist and the boom grasping mechanism are sized and shaped for conveying the rake float and the aquatic rake between a conveyance vehicle and a surface of a body of water.

26. A lake rake according to claim 1 and further comprising:

a rake float in the form of a boat;

a rake-handling loop on an aquatic-rake tongue in the vicinity of a horizontal rake bar to which rake tines are attached;

a rake latch swivelably attached to a latch beam;

latch cross-beams attached orthogonally to the latch beam and attachable to top sides of the boat;

a latch buttress arm positionable against a latch-beam buttress;

a latch spring contractible biased between a latch bias arm and the latch beam;

a latch locking member in sliding contact with the latch beam and positionable slidably over the latch buttress arm and the latch beam;

a latch release arm pivotally attached to the latch beam;

a latch-actuation rod swivelably attached to the latch-release arm and the latch locking member; and a latch-release line attachable to the latch-release arm.

27. A lake rake according to claim 1 wherein the means for anchoring the motorized vehicle in opposition to winching action between the aquatic rake and the motorized vehicle is an anchor tooth extendible from opposite sides of the articulated-boom hoist downwardly into a surface on which the motorized vehicle is positioned.

28. A lake rake according to claim 27 wherein each anchor tooth is positionable at a select distance from attachment of the articulated-boom hoist and further comprising:
horizontally swivelable attachment of the articulated-boom hoist to the motorized vehicle; and
a base plate attachable to each anchor tooth.

29. A lake rake according to claim 1 and further comprising:
hook eyes in the float; and
a sling means attachable to the hook eyes and the articulated-boom hoist.

30. A method for using a lake rake having:
an articulated-boom hoist attachable to a motorized vehicle;
a winch attachable to the motorized vehicle in workable proximity to the articulated-boom hoist;
an aquatic rake attachable to a line from the winch;
an aquatic surface rake attachable to a line from the winch;
a rake float on which the aquatic rake and the aquatic surface rake are transportable; 7 a grasping mechanism attachable to an opposite end of the articulated-boom hoist from an end of the articulated-boom hoist that is attachable to the motorized vehicle;
a means for conveying the rake float between a float carrier and a body of water;
a means for positioning the aquatic rake on the rake float;
a means for removing the aquatic rake from the rake float when the rake float is at a select distance from the motorized vehicle on the body of water;
a propulsion means for positioning the rake float at select distances from the motorized vehicle on the body of water;
a winch line operable by the winch in winching relationship between the motorized vehicle and the aquatic rake at select distances from the motorized vehicle in the body of water;
a means for anchoring the motorized vehicle in opposition to winching action between the aquatic rake and the motorized vehicle; and
a means for conveying aquatic growth from the aquatic rake to an aquatic growth dump site; comprising the following steps:
(A) conveying the rake float from the float carrier to a body of water with the articulated-boom hoist;
(B) positioning the aquatic rake on the rake float with the articulated-boom hoist;
(C) causing the rake float to be propelled and steered to a select position on a body of water;
(D) dropping the aquatic rake into the body of water from the rake float;
(E) anchoring the motorized vehicle to a surface on which it rests;
(F) winching the aquatic rake in a direction of the motorized vehicle;
(G) lifting the aquatic rake and aquatic growth thereon with the articulated-boom hoist;
(H) driving the motorized vehicle to a select dumping location;
(I) tilting a tongue of the aquatic rake downwardly and shaking the aquatic rake as necessary with the articulated-boom hoist until aquatic growth collected on the aquatic rake falls from the aquatic rake onto a dump site; and (J) returning the aquatic rake to the rake float in select repetition of the above steps as desired.

31. A method according to claim 30 and including the following additional steps:
(A) repositioning the aquatic rake on a rake carrier with the articulated-boom hoist;
(B) positioning the aquatic surface rake on the rake float with the articulated-boom hoist; and
(C) repeating the same steps for the aquatic surface rake as for the aquatic rake as desired.

32. A method for using a lake rake having:
an articulated-boom hoist attachable to a motorized vehicle;
a winch attachable to the motorized vehicle in workable proximity to the articulated-boom hoist;
an aquatic rake attachable to a line from the winch;
an aquatic surface rake attachable to a line from the winch;
a rake float on which the aquatic rake and the aquatic surface rake are transportable;
a grasping mechanism attachable to an opposite end of the articulated-boom hoist from an end of the articulated-boom hoist that is attachable to the motorized vehicle;
a means for conveying the rake float between a float carrier and a body of water;
a means for positioning the aquatic rake on the rake float;
a means for removing the aquatic rake from the rake float when the rake float is at a select distance from the motorized vehicle on the body of water;
a float boom that is expandable and contractible in length and attachable to the motorized vehicle and the rake float;
a winch line operable by the winch in winching relationship between the motorized vehicle and the aquatic rake at select distances from the motorized vehicle in the body of water;
a means for anchoring the motorized vehicle in opposition to winching action between the aquatic rake and the motorized vehicle;
horizontally-pivotal attachment of the articulated-boom hoist to the motorized vehicle; and
a stabalizing base plate attachable to each side of the motorized vehicle; comprising the following steps:
(A) conveying the rake float from the float carrier to a body of water with the articulated-boom hoist;
(B) positioning the aquatic rake on the rake float with the articulated-boom hoist;
(C) causing the rake float to be pushed to a select position on a body of water with the expandable and contractible float arm;
(D) causing the aquatic rake to be dropped into the body of water from the rake float;
(E) anchoring the motorized vehicle to a surface on which it rests;
(F) positioning the base plates in selective side-support relationship to the motorized vehicle;
(G) winching the aquatic rake in a direction of the motorized vehicle;
(H) lifting the aquatic rake and aquatic growth collected thereon with the articulated-boom hoist;
(I) raising the aquatic rake and aquatic growth collected thereon to a desired height in relationship to a dump site with the articulated-boom hoist;

(J) horizontally pivoting the horizontally-pivotal articulated-boom hoist in a desired rotational arc in relationship to a dump site;

(K) tilting a tongue of the aquatic rake downwardly and shaking the aquatic rake as necessary with the articulated-boom hoist to remove aquatic growth collected on the aquatic rake and to dump the aquatic growth onto the dump site;

(L) returning the aquatic rake to the rake float and repeating the above steps as desired.

33. A method according to claim 32 and including the following additional steps:

(A) repositioning the aquatic rake on the rake carrier with the articulated-boom arm;

(B) positioning the aquatic surface rake on the rake float; and (C) repeating the same steps for the aquatic surface rake as for the aquatic rake as desired.

* * * * *